US010319219B2

(12) United States Patent
Hinode et al.

(10) Patent No.: US 10,319,219 B2
(45) Date of Patent: Jun. 11, 2019

(54) DEVICE, METHOD, AND SYSTEM FOR MANAGING DEVICE CONTROL

(71) Applicants: Sharp Kabushiki Kaisha, Sakai, Osaka (JP); Kabushiki Kaisha Toshiba, Tokyo (JP); NEC Corporation, Tokyo (JP); Mitsubishi Electric Corporation, Tokyo (JP)

(72) Inventors: Haruo Hinode, Sakai (JP); Takayuki Amatsu, Tokyo (JP); Hiroshi Masuda, Tokyo (JP); Naoki Endo, Tokyo (JP); Morio Hirahara, Kanagawa (JP); Takeshi Suetsugu, Tokyo (JP); Yoichi Masuda, Tokyo (JP); Shoji Mochizuki, Tokyo (JP)

(73) Assignees: SHARP KABUSHIKI KAISHA, Sakai (JP); KABUSHIKI KAISHA TOSHIBA, Tokyo (JP); NEC CORPORATION, Tokyo (JP); MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/839,890

(22) Filed: Dec. 13, 2017

(65) Prior Publication Data

US 2018/0174440 A1 Jun. 21, 2018

(30) Foreign Application Priority Data

Dec. 15, 2016 (JP) ................................ 2016-243716

(51) Int. Cl.

| | |
|---|---|
| ***G06F 21/60*** | (2013.01) |
| ***G08C 19/00*** | (2006.01) |
| ***G08C 17/02*** | (2006.01) |

(52) U.S. Cl.
CPC ............. *G08C 19/00* (2013.01); *G08C 17/02* (2013.01); *G08C 2201/42* (2013.01); *G08C 2201/50* (2013.01)

(58) Field of Classification Search
None
See application file for complete search history.

(56) References Cited

U.S. PATENT DOCUMENTS 7,224,980 B2 * 5/2007 Hara ........................ B60R 25/24 340/10.1
8,232,863 B2 * 7/2012 Nakajima ............. B60R 25/245 340/5.61
2005/0038574 A1 * 2/2005 Gila ........................ G01S 13/84 701/2

FOREIGN PATENT DOCUMENTS

JP 2016-039564 A 3/2016

* cited by examiner

*Primary Examiner* — K. Wong
(74) *Attorney, Agent, or Firm* — Keating & Bennett, LLP

(57) ABSTRACT

A first device according to one embodiment includes, but is not limited to, receiver circuitry, determinator circuitry, and transmitter circuitry. The receiver circuitry is configured and/or programmed to receive from a second device, first information for controlling a third device. The determinator circuitry is configured and/or programmed to determine whether or not the first information is to be transmitted to the third device, based on whether or not the first information is associated with second information stored in the first device. The second information includes at least a first operation command for controlling a first operation of the third device. The transmitter circuitry is configured and/or programmed to, in a case that the first information is determined to be transmitted to the third device, transmit the first information to the third device.

15 Claims, 7 Drawing Sheets

FIG. 3

DR

| APPLICATION IDENTIFIER aID | OPERATION COMMAND (CT) |
|---|---|
| AIR CONDITIONER OPERATION APPLICATION (APP1) | AIR CONDITIONER POWER-ON (CT1) |

FIG. 4

JR1

| APPLICATION REFERENCE INFORMATION aJR | OPERATION REFERENCE INFORMATION MD |
|---|---|
| AIR CONDITIONER OPERATION APPLICATION (APP1) | OPERATION REFERENCE INFORMATION MD11 AIR CONDITIONER POWER-ON (CT1) |
| | OPERATION REFERENCE INFORMATION MD12 |
| | OPERATION REFERENCE INFORMATION MD13 |
| | OPERATION REFERENCE INFORMATION MD14 |
| WINDOW OPERATION APPLICATION (APP2) | OPERATION REFERENCE INFORMATION MD21 |
| | OPERATION REFERENCE INFORMATION MD22 |
| | OPERATION REFERENCE INFORMATION MD23 |
| | OPERATION REFERENCE INFORMATION MD24 |
| ... | ... |

FIG. 5

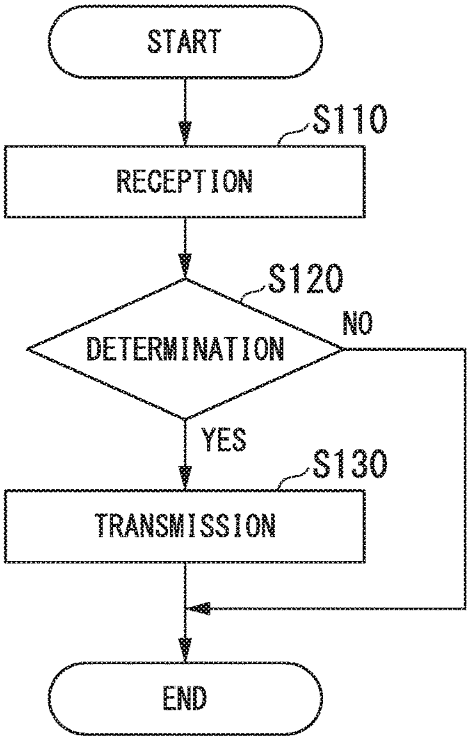

FIG. 6

JR1

| APPLICATION REFERENCE INFORMATION aJR | OPERATION REFERENCE INFORMATION MD |
|---|---|
| AIR CONDITIONER OPERATION APPLICATION (APP1) | OPERATION REFERENCE INFORMATION MD11 AIR CONDITIONER POWER-ON (CT1) |
| | OPERATION REFERENCE INFORMATION MD13 |
| | OPERATION REFERENCE INFORMATION MD14 |
| WINDOW OPERATION APPLICATION (APP2) | OPERATION REFERENCE INFORMATION MD21 |
| | OPERATION REFERENCE INFORMATION MD22 |
| ... | ... |

FIG. 9

| APPLICATION REFERENCE INFORMATION aJR | NON-TRANSMISSION NUMBER OF TIMES |
| --- | --- |
| AIR CONDITIONER OPERATION APPLICATION(APP1) | 1 |
| WINDOW OPERATION APPLICATION (APP2) | 0 |
| ... | ... |

DEVICE, METHOD, AND SYSTEM FOR MANAGING DEVICE CONTROL

BACKGROUND OF THE INVENTION

Field of the Invention

The present invention relates to a device, method, and system for managing device control.

Priority is claimed on Japanese Patent Application No. 2016-243716, filed Dec. 15, 2016, the content of which is incorporated herein by reference.

Description of the Related Art

According to the related art, Home Energy Management Systems (HEMSs) that perform household energy management are known. Regarding the HEMSs, to reduce energy consumption or the like, technology of controlling operation of one or more HEMS-compatible apparatuses (hereinafter referred to as "HEMS apparatuses") in a home via an HAN (Home Area Network) is known (for example, see Japanese Patent Application Laid-Open Publication No. 2016-39564).

There are cases where operations of HEMS apparatuses are controlled based on a control method predetermined by each manufacturer or retailer of the HEMS apparatuses, or a control method predetermined by each manufacturer or retailer of devices for controlling the HEMS apparatuses.

In these cases, it has been difficult to standardize the control method since the operations of the HEMS apparatuses are controlled based on the different standard for each manufacturer or retailer of the HEMS apparatuses or the different control method predetermined by each manufacturer or retailer of the devices for controlling the HEMS apparatuses.

SUMMARY

A first device according to one embodiment includes, but is not limited to, receiver circuitry, determinator circuitry, and transmitter circuitry. The receiver circuitry is configured and/or programmed to receive from a second device, first information for controlling a third device. The determinator circuitry is configured and/or programmed to determine whether or not the first information is to be transmitted to the third device, based on whether or not the first information is associated with second information stored in the first device. The second information includes at least a first operation command for controlling a first operation of the third device. The transmitter circuitry is configured and/or programmed to, in a case that the first information is determined to be transmitted to the third device, transmit the first information to the third device.

A method for a first device according to another embodiment of the present invention includes, but is not limited to, the following processes. The first device receives from a second device, first information for controlling a third device. The first device determines whether or not the first information is to be transmitted to the third device, based on whether or not the first information is associated with second information stored in the first device. The second information includes at least a first operation command for controlling a first operation of the third device. In a case that the first information is determined to be transmitted to the third device, the first device transmits the first information to the third device.

A system according to another embodiment of the present invention includes, but is not limited to: a first device; a second device to be controlled by the first device; and a third device configured to communicate with the first device and the second device. The third device includes, but is not limited to, receiver circuitry, determinator circuitry, and transmitter circuitry. The receiver circuitry is configured and/or programmed to receive from the first device, first information for controlling the second device. The determinator circuitry is configured and/or programmed to determine whether or not the first information is to be transmitted to the second device, based on whether or not the first information is associated with second information stored in the third device. The second information includes at least a first operation command for controlling a first operation of the second device. The transmitter circuitry is configured and/or programmed to, in a case that the first information is determined to be transmitted to the second device, transmit the first information to the second device.

BRIEF DESCRIPTION OF THE DRAWINGS

The above features and advantages of the present invention will be more apparent from the following description of certain preferred embodiments taken in conjunction with the accompanying drawings.

FIG. 3 schematically shows a table example of control information according to the first embodiment.

FIG. 4 schematically shows a table example of first determination reference information according to the first embodiment.

FIG. 5 shows a flowchart showing a processing example of the device control manager according to the first embodiment.

FIG. 6 schematically shows a table example of first determination reference information according to a first modified example.

FIG. 9 shows a table example of history information according to the second embodiment.

DETAILED DESCRIPTION OF THE PREFERRED EMBODIMENTS

The present invention will now be described herein with reference to illustrative embodiments. The accompanying drawings explain a method, device, and system for managing device control in the embodiments. The size, the thickness, and the like of each illustrated portion might be different from those of each portion of an actual device.

Those skilled in the art will recognize that many alternative embodiments can be accomplished using the teachings of the present invention and that the present invention is not limited to the embodiments illustrated herein for explanatory purposes.

First Embodiment

[Device Control Management System]

Figure 1:
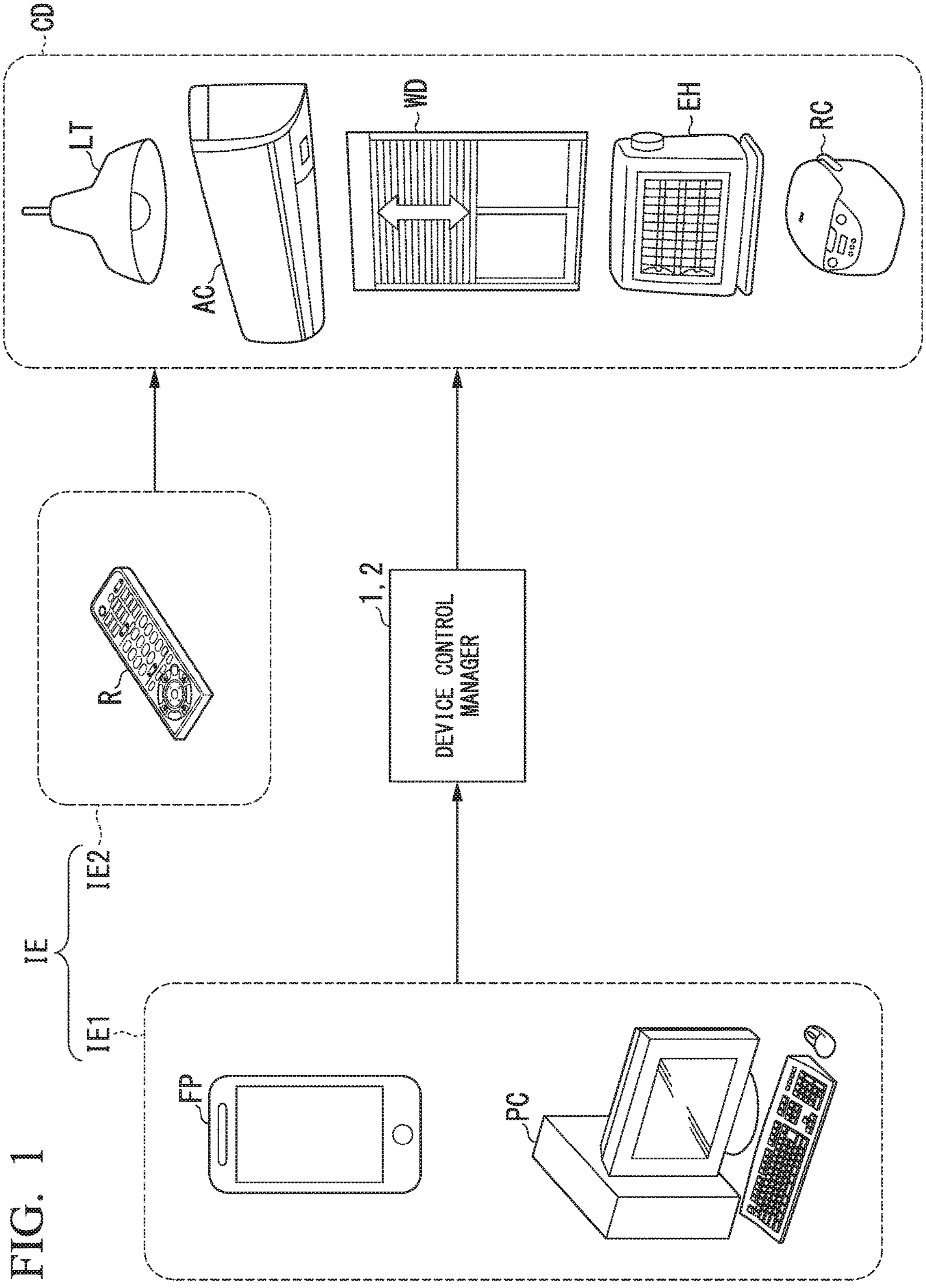
FIG. 1 schematically illustrates a device control management system according to a first embodiment.

Hereinafter, a first embodiment of the present invention will be described with reference to the drawings. FIG. 1 schematically illustrates a device control management system according to a first embodiment.

Device controllers IE are devices that control operations of devices CD to be controlled (hereinafter referred to as "controlled devices CD"). Examples of the device controller IE include: a remote controller R that controls operations of the controlled devices CD using infrared rays or other radio waves; and a smartphone FP and a computer PC which control operations of the controlled devices CD via a network, such as a WAN (Wide Area Network).

Hereinafter, the device controller IE configured to control operations of the controlled devices CD via a network will be referred to as "a device controller IE1," while the device controller IE configured to control operations of the controlled devices CD without a network will be referred to as "a device controller IE2."

Examples of the controlled devices CD include electric appliances installed in a house of a general household, or the like. Specifically, the controlled devices CD include a lighting equipment LT in a living room, an air conditioner AC that adjusts the temperature and humidity of the living room, a window WD to be opened and closed according to control information from the device controllers IE, a heater EH that raises the temperature of the living room, an electric cooking appliance such as a rice cooker RC, and the like.

Hereinafter, a house of a general household installed with the controlled devices CD is simply referred to as "a house". Additionally, a member of the household in the house is simply referred to as "a resident."

Examples of the devices CD to be controlled according to control information transmitted from the device controller IE1 include an HA (Home Automation) device. The device controller IE1 can remote control the controlled devices CD by transmitting control information via the network.

[Operational Error of Device Controller]

In a case of controlling operation of the controlled device CD from the outdoors, an operator of the device controller IE1 has difficulty in confirming the state of the controlled device CD operating according to control information transmitted from the device controller WE In such a case, it is difficult for the operator of the device controller IE1 to notice an operational error such that the operator has sent the control information to a wrong device CD intended not to be controlled, or the operator has sent wrong control information to the device CD intended to be controlled.

Thus, it is difficult for the operator of the device controller IE1 to get aware of such operational errors.

[Operational Error of Malicious Device Controller]

In a case of controlling operation of the controlled device CD via the network, there is a risk that the operation of the controlled device CD might be controlled by an unauthorized operator or a malicious program, such as when the window WD as the controlled device CD is opened or closed by an unauthorized operator or a malicious program. In such a case, the window WD is opened or closed against the resident's intent, thus threatening the safety of the house.

There is another risk that the temperature setting of the air conditioner AC as the controlled device CD might be controlled by an unauthorized operator or a malicious program. In such a case, the air conditioner AC operates according to the malicious program or control information sent from the unauthorized operator, so that the temperature of a room installed with the air conditioner AC is raised or lowered, thereby making it likely to impair the health of the resident.

The device controller IE1 of the present embodiment controls operation of the controlled device CD via a device control manager 1. The device control manager 1 determines whether or not control information for controlling the controlled device CD received from the device controller IE1 is proper. If the control information received from the device controller IE1 is proper, the device control manager 1 transmits the control information to the controlled device CD.

[Configuration of Device Control Manager]

Figure 2:
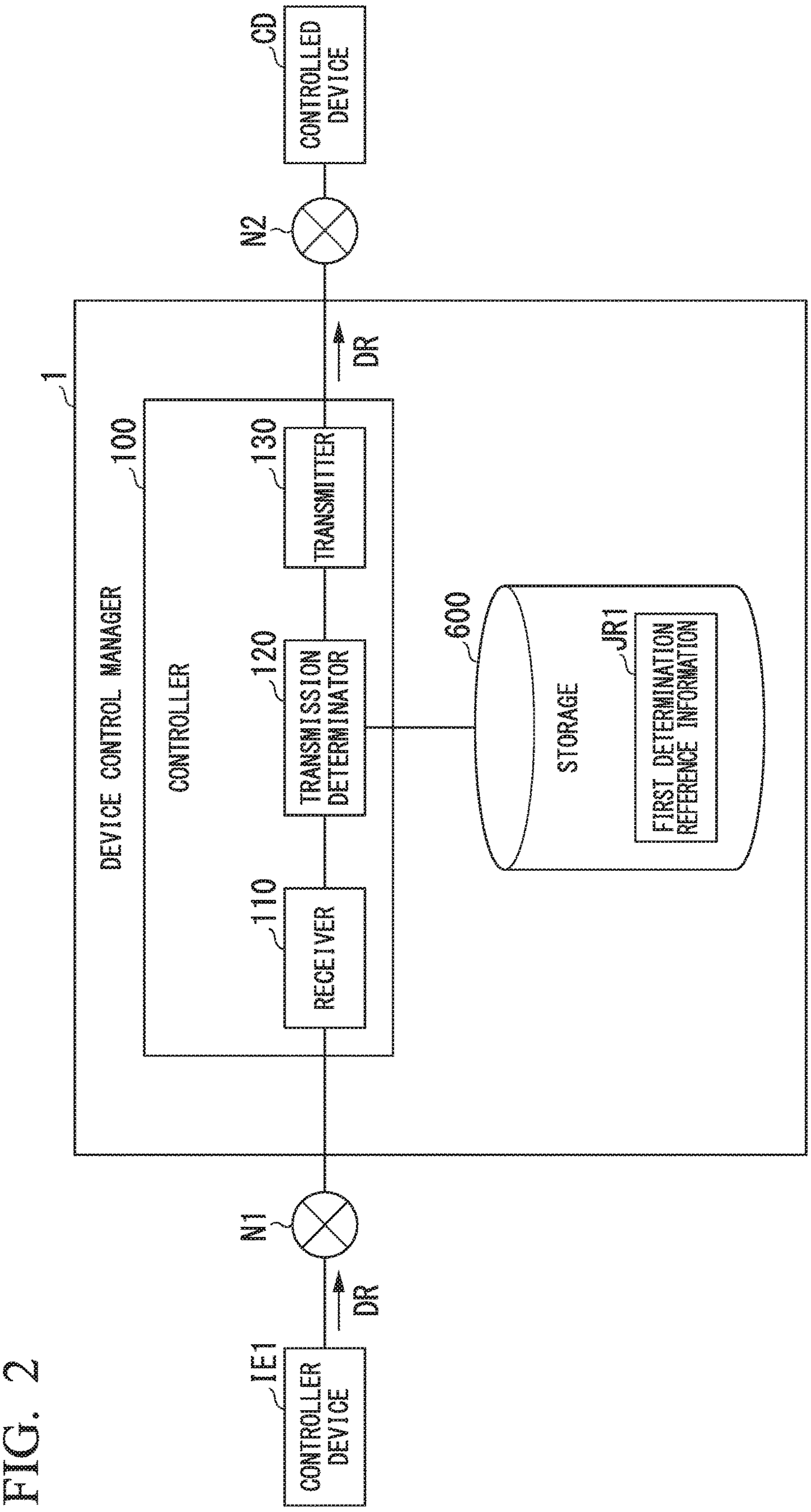
FIG. 2 schematically illustrates a configuration example of a device control manager according to the first embodiment.

Hereinafter, a configuration of the device control manager 1 of the present embodiment will be described with reference to FIG. 2. FIG. 2 schematically illustrates a configuration example of the device control manager 1 according to the first embodiment.

As shown in FIG. 2, the device control manager 1 and the device controller IE1 are connected via a network N1, such as a WAN. Additionally, the device control manager 1 and the controlled device CD are connected via a network N2, such as a LAN (Local Area Network).

The device controller IE1 transmits control information DR to the device control manager 1 via the network N1. The control information DR is information for controlling operation of the controlled device CD.

[Control Information]

Hereinafter, the details of the control information DR of the present embodiment will be described with reference to FIG. 3. FIG. 3 schematically shows a table example of control information DR according to the first embodiment.

The control information DR includes an application identifier aID and an operation command CT. The application identifier aID is information to identify an application and software, or the like, to be used for the device controller IE1 to transmit the control information DR. Hereinafter, an application to be executed by the device controller IE1 to transmit the control information DR to a controlled device CD is simply referred to as an "application."

The operation command CT is an operation command for the device controller IE1 to control the controlled device CD. In the example of FIG. 3, the control information DR include an application identifier aID (APP1) indicating an application to operate an air conditioner, and an operation command CT (CT1) indicating power-on of the air conditioner

[Device Control Manager]

Returning to FIG. 2, the device control manager 1 includes a controller 100 and a storage 600. The storage 600 previously stores first determination reference information JR1.

[First Determination Reference Information]

Hereinafter, the first determination reference information JR1 will be described with reference to FIG. 4. FIG. 4 schematically shows a table example of the first determination reference information JR1 according to the first embodiment.

The first determination reference information JR1 is reference information to be used for determining whether or not the control information DR received from the device controller IE1 is proper to be transmitted to the controlled device CD. As shown in FIG. 4, the first determination reference information JR1 includes application reference information aJR and operation reference information MD.

The application reference information aJR is information indicating the application identifier aID of the application and software authorized to be used for controlling the operations of the controlled devices CD. Specifically, the application and software identified by the application identifier aID included in the application reference information aJR meet the device control standard used in controlling the operations of the controlled devices CD. Examples of the device control standard include the safety standard provided by a certificate authority that evaluates the safety of applications and softwares.

The operation reference information MD indicates an authorized operation command CT among the operation commands CTs of the controlled devices to be controlled by the device controller IE1.

In the example of FIG. 4, the first determination reference information JR1 includes application reference information aJR (APP1) indicating an application to operate an air conditioner, and operation reference informations MD11 to MD14 indicating authorized operation commands CTs among the operation commands CTs for operating the air conditioner. Additionally, the operation reference information MD11 indicates power-on of the air conditioner (i.e., operation command CT1). In other words, the power-on of the air conditioner indicated by the operation command CT1 is an authorized operation and is included in the first determination reference information JR1 as the operation reference information MD11.

Further, the first determination reference information JR1 includes application reference information aJR (APP2) indicating an application to operate a window, and operation reference informations MD21 to MD24 indicating authorized operation commands CT among the operation commands CT for operating the window. Here, the application identifier aID of the application to operate a window is (APP2).

[Authenticator]

Here, an authenticator VF evaluates and authenticates whether an application provider PV is providing applications based on the safety standard of applications and softwares. When the provider PV is authenticated by the evaluation, the authenticator VF includes in the first determination reference information JR1, the application identifier aID of the application provided by the provider PV, as the application reference information aJR.

Additionally, the authenticator VF acquires from the provider PV, a list of operation commands CTs that the application with the application identifier aID indicated by the application reference information aJR transmits to the controlled device CD. The authenticator VF includes in the first determination reference information JR1, the operation commands CTs included in the list, as the operation reference informations MDs.

As described above, the control information DR includes the application identifier aID and the operation command CT. Therefore, the authenticator VF associates, using the application identifier aID, the operation command CT included in the control information DR with the operation reference information MD included in the first determination reference information JR1.

[Controller]

Returning to FIG. 2, the controller 100 includes a CPU (Central Processing Unit), and, as its functional elements, a receiver 110, a transmission determinator 120, and a transmitter 130.

The receiver 110 receives the control information DR from the device controller IE1 via the network N1. The receiver 110 gives the received control information DR to the transmission determinator 120.

The transmission determinator 120 receives the control information DR from the receiver 110. Additionally, the transmission determinator 120 retrieves the first determination reference information JR1 from the storage 600. The transmission determinator 120 determines whether or not to transmit the control information DR to the controlled device CD, based on whether or not the operation command CT included in the control information DR is associated with the operation reference information MD included in the first determination reference information JR1. Specifically, the transmission determinator 120 determines whether the operation command CT included in the control information DR is associated with the operation reference information MD included in the first determination reference information JR1 using the application identifier aID. If it is determined that the operation command CT is associated with the operation reference information MD using the application identifier aID, the transmission determinator 120 gives the control information DR to the transmitter 130. Conversely, if it is determined that the operation command CT is not associated with the operation reference information MD using the application identifier aID, the transmission determinator 120 does not give the control information DR to the transmitter 130.

In this example of FIG. 4, the "air conditioner power-on" (operation command CT1) included in the control information DR is associated with the operation reference information MD11 using the application identifier aID (APP1). Therefore, the transmission determinator 120 gives the control information DR to the transmitter 130.

The transmitter 130 receives the control information DR from the transmission determinator 120. The transmitter 130 transmits the received control information DR to the controlled device CD via the network N2. The controlled device CD operates according to the control information DR transmitted from the device control manager 1.

[Association Between Control Information and First Determination Reference Information]

Although the description has been given above with respect to the case where the authenticator VF associates the operation command CT included in the control information DR with the operation reference information MD included in the first determination reference information JR1 using the application identifier aID, the present embodiment is not limited thereto. For example, in place of the application identifier aID, the authenticator VF may use a hash value to associate the operation command CT included in the control information DR with the operation reference information MD included in the first determination reference information JR1. In this case, the control information DR includes the hash value and the operation command CT, while the first determination reference information JR1 includes the hash value and the operation reference information MD. Additionally, the transmission determinator 120 determines whether or not the operation command CT included in the control information DR is associated with the operation reference information MD included in the first determination reference information JR1 using the hash value.

Further, although the description has been given above with respect to the case where the first determination reference information JR1 includes information (in this example, application identifier aID) that associates the operation command CT included in the control information DR with the operation reference information MD, the present embodiment is not limited thereto. For example, in a case where the first determination reference information JR1 is managed by an unique identifier for each application, association information indicating association between the application and the identifier of the first determination reference information JR1 may be stored in the storage 600. In this case, the transmission determinator 120 determines whether or not the operation command CT included in the control information DR is associated with the identifier of the first determination reference information JR1 (operation reference information MD) using the association information.

[Operation of Device Control Manager]

Hereinafter, processing of the device control manager 1 will be described with reference to FIG. 5. FIG. 5 shows a flowchart showing a processing example of the device control manager 1 of the first embodiment.

The receiver 110 receives the control information DR from the device controller IE1 (step S110). The transmission determinator 120 determines whether the control information DR received by the receiver 110 is associated with the first determination reference information JR1 (step S120). If the transmission determinator 120 determines that the control information DR is associated with the first determination reference information JR1 (step S120; YES), the transmitter 130 transmits the control information DR to the controlled device CD (step S130). If the transmission determinator 120 determines that the control information DR is not associated with the first determination reference information JR1 (step S120; NO), the device control manager 1 ends the processing.

Summary of First Embodiment

As described above, the device control manager 1 includes the controller 100 and the storage 600. In the storage 600, the first determination reference information JR1 is stored previously. Additionally, the controller 100 includes the receiver 110, the transmission determinator 120, and the transmitter 130. The receiver 110 receives from the controller device IE, the control information DR for controlling the controlled device CD. The transmission determinator 120 determines whether or not to transmit the control information DR to the controlled device CD, based on whether or not the control information DR is associated with the first determination reference information JR1. The transmitter 130 transmits to the controlled device CD, the control information DR if the transmission determinator 120 determines the control information DR to be transmitted.

[Case where Application has Problem]

Here, there is a case where the application malfunctions so as to transmit the control information DR including an erroneous operation command CT. For example, the malfunction of the application is an operation inconsistent with the design specification of the application. Additionally, the erroneous operation command CT is, for example, a debugging command or the like used by the provider PV in creating the application, which is not proper to be transmitted to the controlled device CD. Here, the erroneous operation command CT included in the control information DR to be transmitted by the device controller IE1 is not included in the first determination reference information JR1, as the operation reference information MD. In other words, the control information DR is not associated with the first determination reference information JR1.

Therefore, according to the device control manager 1 of the present embodiment, even in a case where the control information DR including an erroneous operation command CT is transmitted by the application, it is possible to prevent the control information DR from being transmitted to the controlled device CD.

[Case where Control Information IS Transmitted from Malicious Operator]

Additionally, there is a case where operation of the controlled device CD is controlled by a malicious operator or a malicious program. In this case, there is a possibility that the application will be altered by a malicious operator or a malicious program, so that the control information DR including an erroneous operation command CT will be transmitted from the device controller IE1. Here, examples of the erroneous operation command CT include a command that significantly rises or falls the temperature of a room installed with the air conditioner AC, a command that opens or closes the window WD against the resident's intent, and the like. Such commands are commands that are improper to be transmitted to the controlled device CD. As described above, the erroneous operation command CT included in the control information DR transmitted by the device controller IE1 is not included in the first determination reference information JR1, as the operation reference information MD. In other words, the control information DR is not associated with the first determination reference information JR1.

Therefore, according to the device control manager 1 of the present embodiment, even in a case where the control information DR including an erroneous operation command CT is transmitted from a malicious operator or a malicious program, it is possible to prevent the control information DR from being transmitted to the controlled device CD.

In other words, according to the device control manager 1 of the present embodiment, it is possible to standardize the method of controlling the operations of the controlled devices CD via the device control manager 1.

Additionally, in the device control manager 1 of the present embodiment, the receiver 110 receives the control information DR transmitted by the device controller IE1 via the application. Then, the transmission determinator 120 determines to transmit the control information DR to the controlled device CD in a case where the control information DR is associated with the first determination reference information JR1 by the application authenticator VF.

According to the device control manager 1 of the present embodiment, the authenticator VF associates the operation command CT included in the control information DR with the operation reference information MD included in the first determination reference information JR1, thereby making it possible to transmit to the controlled device CD, the control information DR based on the authentication standard.

First Modified Example

Hereinafter, a first modified example according to the first embodiment will be described with reference to the drawings.

The description has been given in the first embodiment with respect to the case where the authenticator VF acquires from the provider PV, a list of operation commands CTs that the application transmits to the controlled device CD, and includes in first determination reference information JR1, all the operation commands CTs included in the acquired list, as the operation reference informations MDs.

Description will be given in the first modified example with respect to a case where the authenticator VF includes in first determination reference information JR1, some, but not all, operation commands CTs included in the acquired list, as the operation reference informations MDs.

Hereinafter, like reference numerals indicate like configurations, and the description thereof is omitted.

FIG. 6 is a table showing an example of the first determination reference information JR1 according to the first modified example.

In this example, the authenticator VF evaluates the operation commands CT included in the list based on the safety standard of applications and softwares. Then, the authenticator VF includes in the first determination reference information JR1, operation commands CTs meeting the safety standard, as the operation reference informations MDs. Specifically, from the list of operation commands CTs (first determination reference information JR1 shown in FIG. 4) that the application transmits to the controlled device CD, the authenticator VF includes in the first determination reference information JR1, the operation reference informations MDs excluding the operation reference informations MD12, MD23, and MD 24.

The transmission determinator 120 determines whether or not to transmit the control information DR to the controlled device CD, based on the above-described first determination reference information JR1 and the control information DR.

Since the subsequent configuration is the same as that of the first embodiment, description thereof will be omitted.

Summary of First Modified Example

As described above, in the device control manager 1 of the first modified example, the first determination reference information JR1 includes a plurality of operation reference informations MDs provided by the application provider PV. Additionally, in the device control manager 1 of the first modified example, the control information DR is associated with at least some of the operation reference informations MDs included in the first determination reference information JR1 by the verifier VF. In a case where the control information DR is associated with the first determination reference information JR1 by the authenticator VF, the transmission determinator 120 of the device control manager 1 according to the first modified example determines to transmit the control information DR to the controlled device CD.

Here, there is a case where even if the provider PV determines that it is proper to transmit an operation command CT to the controlled device CD, the authenticator VF determines that it is improper to transmit the operation command CT to the controlled device CD.

According to the device control manager 1 of the first modified example, among the control informations DRs transmitted by the application provided by the provider PV, only the control information DR authenticated by the authenticator VF may be associated with the first determination reference information JR1. This enables the device control manager 1 of the first modified example to transmit to the controlled device CD, the control information DR based on the authentication standard.

Second Modified Example

Hereinafter, a second modified example according to the first embodiment will be described with reference to the drawings.

The description has been given in the first embodiment and the first modified example with respect to the case where the device control manager 1 determines whether or not to transmit the control information DR to the controlled device CD, based on whether or not the control information DR is associated with the first determination reference information JR1 by the authenticator VF.

Description will be given in the second modified example with respect to a case where the device control manager 1 determines whether or not to transmit the control information DR to the controlled device CD, based on whether or not the operation command CT included in the control information DR is associated with operation reference information MD which is the operation command CT selected by a user of the controlled device CD.

Hereinafter, like reference numerals indicate like configurations, and description thereof is omitted.

Figure 7:
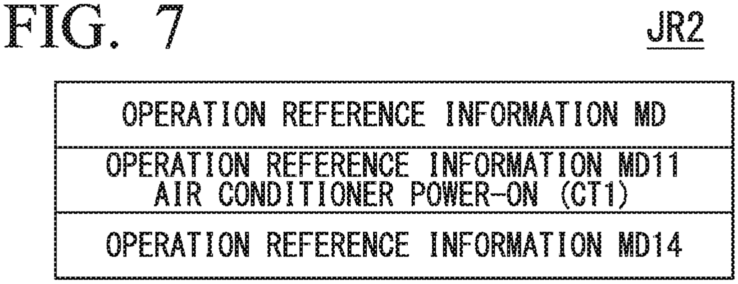
FIG. 7 schematically shows a table example of second determination reference information according to a second modified example.

Hereinafter, second determination reference information JR2 will be described with reference to FIG. 7. FIG. 7 schematically shows a table example of second determination reference information JR2 according to the second modified example.

The second determination reference information JR2 is information including some operation reference informations MDs selected by the user of the controlled device CD from the operation reference informations MDs indicated by the first determination reference information JR1. Here, the user of the controlled device CD is, for example, a resident.

As shown in FIG. 7, the second determination reference information JR2 includes the operation reference information MD11 and the operation reference information MD14 which are selected by the resident from the operation reference informations MDs included in the first determination reference information JR1. In other words, the resident allows the operation commands indicated by the operation reference information MD11 of the air conditioner operation application and the operation reference information MD14, but does not allow other operation commands.

The transmission determinator 120 determines to transmit control information DR to the controlled device CD in a case where the control information DR is associated with the first determination reference information JR1, and the operation command CT included in the control information DR is included as the operation reference information MD in the second determination reference information JR2.

Since the subsequent configuration is the same as that of the first embodiment, description thereof will be omitted.

Summary of Second Modified Example

As described above, in the device control manager 1 according to the second modified example, the transmission determinator 120 determines whether or not to transmit control information DR to the controlled device CD, based further on the second determination reference information JR2 indicating the operation reference information MD selected by the user of the controlled device CD (in this example, the resident) from the operation reference informations MDs included in the first determination reference information JR1.

Here, there is a case where even if the provider PV determines that it is proper to transmit an operation command CT to the controlled device CD, the authenticator VF determines that it is improper to transmit the operation command CT to the controlled device CD.

According to the device control manager 1 of the second modified example, the operation command CT selected by the resident can be transmitted to the controlled device CD. Therefore, the device control manager 1 according to the second modified example can transmit to the controlled device CD, the control information DR desired by the resident to operate the controlled device CD.

Second Embodiment

Hereinafter, a second embodiment of the present invention will be described with reference to the drawings.

The description has been given in the first embodiment and the modified examples with respect to the case where the control information DR is transmitted to the controlled device CD in a case where the operation command CT included in the control information DR is associated with the operation reference information MD included in the first determination reference information JR1.

Description will be given in the second embodiment with respect to a case where a transmission determinator 121 included in a device control manager 2 determines whether or not to transmit the control information DR to the controlled device CD based further on a history of results of the determination made by the transmission determinator 121.

Hereinafter, like reference numerals indicate like configurations, and description thereof is omitted.

[Device Control Manager]

Figure 8:
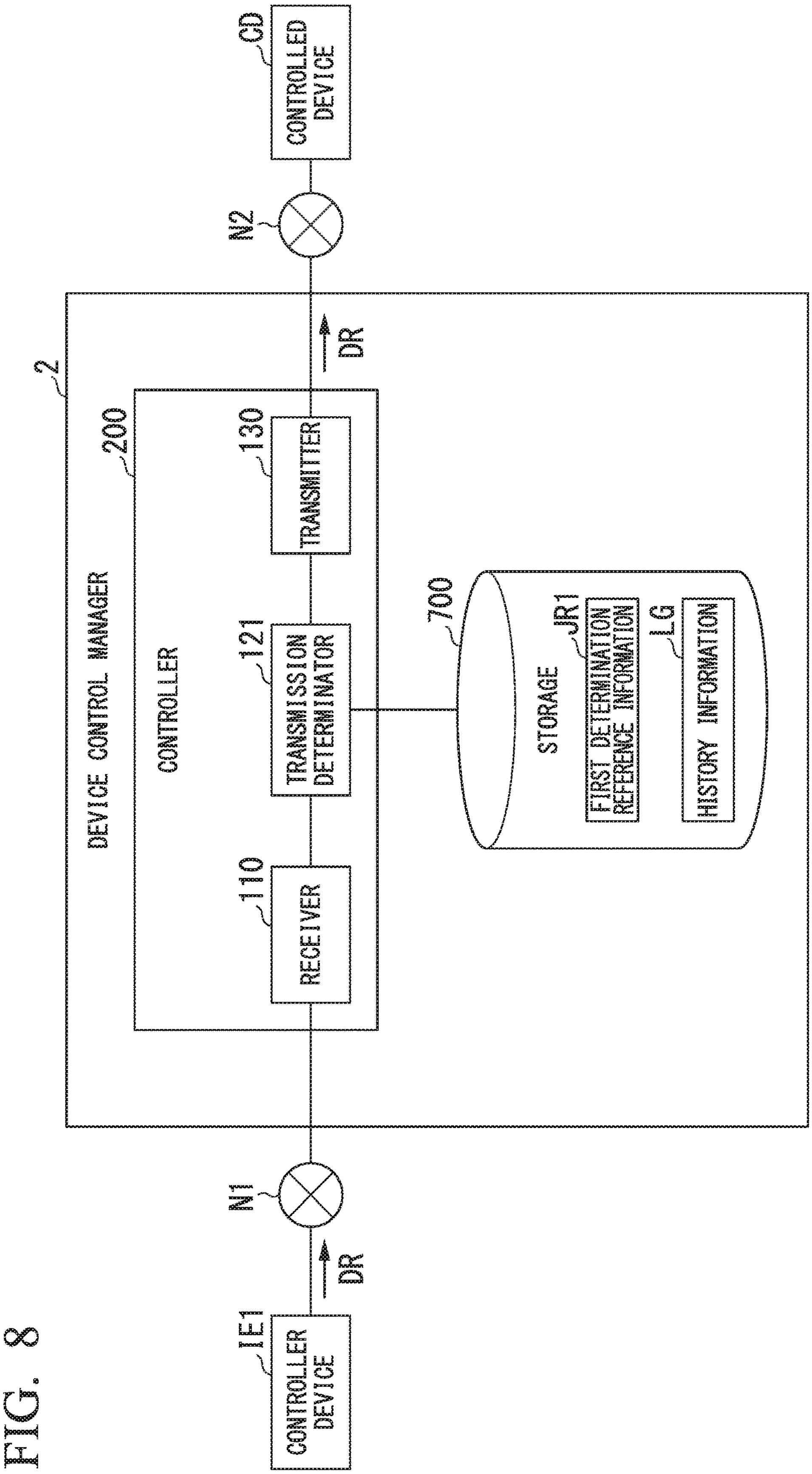
FIG. 8 schematically illustrates a configuration example of a device control manager according to a second embodiment.

FIG. 8 schematically illustrates a configuration example of the device control manager 2 according to the second embodiment. The device control manager 2 of the second embodiment includes a controller 200 and a storage 700.

[Controller]

The controller 200 includes a CPU, and as functional units thereof, includes a receiver 110, the transmission determinator 121, and a transmitter 130.

The transmission determinator 121 of the present embodiment determines whether or not to transmit the control information DR to the controlled device CD, based on the control information DR and the first determination reference information JR1. Additionally, the transmission determinator 121 stores results of the determination in history information LG. The history information LG is information indicating the history of the determination of whether or not to transmit the control information DR, which has been made by the transmission determinator 121. In this example, in a case where it is determined that the control information DR is not transmitted to the controlled device CD, the transmission determinator 121 stores in the storage 700, the application identifier aID included in the control information DR and the result of the determination (i.e., not to be transmitted) in association with each other.

Hereinafter, the history information LG indicates information associating the application identifier aID included in the control information DR determined by the transmission determinator 121 not to be transmitted to the controlled device CD and the number of times that it has been determined not to transmit the control information DR transmitted by the application with the application identifier aID (non-transmission number of times).

Therefore, the first determination reference information JR1 and the history information LG are stored in the storage 700.

[History Information]

Hereinafter, the details of the history information LG will be described with reference to the drawings. FIG. 9 shows a table example of the history information LG according to the second embodiment.

In this example, the history information LG includes the application identifier aID (APP1) of the air conditioner operation application and the non-transmission number of times (1) of the application in association with each other. Additionally, the history information LG includes the application identifier aID (APP2) of the window operation application and the non-transmission number of times (0) of the application are stored in association with each other.

Here, the non-transmission number of times of an application indicates the number of times the control information DR transmitted by the application has been determined not to be transmitted to the controlled device CD.

The transmission determinator 121 determines whether or not to transmit the control information DR to the controlled device CD, based on the control information DR, the first determination reference information JR1, and the history information LG.

For example, in a case where the non-transmission number of times indicated by the history information LG is equal to or more than a predetermined value, the transmission determinator 121 determines not to transmit the control information DR to the controlled device CD. The predetermined value is, for example, "3", which is determined by the authenticator VF verifying that even if the application transmits an erroneous operation command CT, the safety of that application is still maintained.

Although the description has been given above with respect to the case where the history information LG includes the application identifier aID and the non-transmission number of times, the present embodiment is not limited thereto. For example, the history information LG may include the application identifier aID, the transmission number of times, and the total transmission number of times. The transmission number of times indicates the number of times the transmission determinator 121 has determined to transmit to the controlled device CD, the control information DR transmitted by the application. Additionally, the total transmission number of times indicates the total number of times the application has transmitted the control information DR to the controlled CD. Based on the history information LG, the transmission determinator 121 may determine whether or not to transmit to the controlled device CD, the control information DR transmitted by the application whose transmission number of times and the total transmission number of times do not match each other.

Summary of Second Embodiment

As described above, the device control manager 2 of the present embodiment includes the controller 200 and the storage 700. The storage 700 stores the first determination reference information JR1 and the history information LG. Additionally, the controller 200 includes the receiver 110, the transmission determinator 121, and the transmitter 130, as functional units.

In the device control manager 2 of the present embodiment, the transmission determinator 121 determines whether or not to transmit the control information DR to the controlled device CD, based on the first determination reference information JR1 and the history information LG indicating the history of the results of the determination based on the control information DR.

[Case where Application has Problem]

As described above, there is a case where the application transmits control information DR including an erroneous operation command CT. For example, in a case where there is a history in which the device control manager 2 received erroneous control information DR in the past due to an erroneous setting by the provider PV, there is a possibility that the control information DR received from that application might include other erroneous operation commands CTs. In this case, the safety of the application may not be ensured.

According to the device control manager 2 of the present embodiment, however, it is possible to determine whether or not to transmit control information DR to the controlled device CD, based on the first determination reference information JR1 and the history information LG showing the history of the results of the determination based on the control information DR, thereby making it possible to transmit to the controlled device CD, the control information DR based on the safety standard.

[Case where Control Information is Transmitted from Malicious Operator]

Additionally, as described above, there is a case where the application transmits control information DR including an erroneous operation command CT. For example, in a case where there is a history in which the device control manager 2 received erroneous control information DR transmitted by a malicious operator or a malicious program, there is a possibility that the control information DR received from the application might include other erroneous operation commands CTs. In this case, the safety of the application may not be ensured.

According to the device control manager 2 of the present embodiment, however, it is possible to determine whether or not to transmit control information DR to the controlled device CD, based on the first determination reference information JR1 and the history information LG showing the history of the results of the determination based on the control information DR, thereby making it possible to transmit to the controlled device CD, the control information CD based on the safety standard.

Although the description has been given above with respect to the case where the storages 600 and 700 previously store the first determination reference information JR1, the present embodiment is not limited thereto. For example, the controllers 100 and 200 may further include a generator (not shown) configured to generate the first determination reference information JR1, based on a plurality of control information previously received from the device controllers IE1 and IE2. Further, the generator of the controllers 100 and 200 may be configured to update the generated first determination reference information JR1, based on control information newly received from the device controllers IE1 and IE2. Moreover, based on the history information LG regarding the plurality of control informations previously received from the device controllers IE1 and IE2, the generator of the controllers 100 and 200 can refer to the history information LG to generate and update the first determination reference information JR1. Additionally, the processing example shown in the flowchart of FIG. 5 may include an additional step of generating and updating the first determination reference information JR1, in the above-described manner.

Here, each constituent element of the device control managers 1 and 2 may be realized by dedicated hardware, a microprocessor and memory, or the like.

Additionally, each constituent element of the device control managers 1 and 2 may include a CPU (central processing unit) and memory so that the functions of the respective elements of the device control managers 1 and 2 can be realized by the CPU loading onto the memory, and executing, a program for realizing the respective functions.

Further, a program for realizing the functions of the respective constituent elements of the device control managers 1 and 2 may be recorded in a computer readable recording medium so that the processing can be performed by a computer system reading and executing the program recorded in the computer readable recording medium. Here, the term "computer system" includes an OS, and hardware such as peripheral devices.

Moreover, the term "computer system" includes homepage providing environments (or display environments) as long as the WWW system is used.

Additionally, the term "computer-readable recording medium" refers to a portable medium, such as a flexible disk, a magneto-optical disk, a ROM, or a CD-ROM, or a storage device, such as a hard disk built in the computer system. Further, the term "computer-readable recording medium" may include: a medium which dynamically stores a program in a short period of time, such as a communication line when the program is transmitted via a network such as the Internet or via a communication line such as a telephone line; and a medium which stores the program in a fixed period of time, such as a volatile memory included in the computer system to be a server or a client in the above case. Moreover, the above-described program may be a program to implement some of the above-described functions or a program to implement the above-described functions in combination with the program already recorded in the computer system.

Additionally, each, some, or all of the respective constituent elements of the device control managers 1 and 2 may be realized typically as an LSI, which is an integrated circuit, or may be realized as a chipset. Each, some, or all of the functional elements may be integrated into a chip. The integration into a circuit is not limited to LSI and may be realized by a dedicated circuit or a general-purpose processor. When a technique for integration into a circuit, which will replace LSI, emerges with the advancement of semiconductor technology, an integrated circuit based on the advanced technique may be used.

The term "configured" is used to describe a component, section or part of a device which includes hardware and/or software that is constructed and/or programmed to carry out the desired function.

Although the embodiments of the present invention have been described above in detail with reference to the drawings, specific configurations are not limited to these embodiments, and any modification and combination of the embodiments may be made without departing from the scope of the present invention.

EXAMPLES

In addition, while not specifically claimed in the claim section, the application reserves the right to include in the claim section at any appropriate time, methods, devices, and systems according to the following examples.

Example A

A1. A method for a first device, the method comprising:

generating first information including a first application identifier and a first operation command, the first application identifier identifying a first application installed in the first device, and the first operation command being used by the first application to control a second device; and transmitting the first information for a third device to determine whether or not to transfer the first information to the second device.

A2. A method for a first device, the method comprising:

receiving from a second device, first information including a first application identifier and a first operation command, the first application identifier identifying a first application installed in the second device, and the first operation command being used by the first application to control a third device; and transferring the first information to the third device in a case of determining based on the first information that the first information is to be transferred.

A3. A first device comprising:

generator circuitry configured and/or programmed to generate first information including a first application identifier and a first operation command, the first application identifier identifying a first application installed in the first device, and the first operation command being used by the first application to control a second device; and transmitter circuitry configured and/or programmed to transmit the first information for a third device to determine whether or not to transfer the first information to the second device.

A4. A first device comprising:

receiver circuitry configured and/or programmed to receive from a second device, first information including a first application identifier and a first operation command, the first application identifier identifying a first application installed in the second device, and the first operation command being used by the first application to control a third device; and transmitter circuitry configured and/or programmed to transfer the first information to the third device in a case of determining based on the first information that the first information is to be transferred.

A5. A system comprising:

a first device;

a second device to be controlled by the first device; and a third device, wherein the first device comprises:

generator circuitry configured and/or programmed to generate first information including a first application identifier and a first operation command, the first application identifier identifying a first application installed in the first device, and the first operation command being used by the first application to control the second device; and transmitter circuitry configured and/or programmed to transmit the first information for the third device to determine whether or not to transfer the first information to the second device.

Example B

B1. A method for a first device, the method comprising:

generating first information associating a first application identifier with at least one operation command which a second device is authorized to use to control a third device; and in a case of receiving from the second device, second information including a second application identifier and a second operation command which are included in the first information, transferring the second information to the third device.

B2. The method according to example B1, further comprising:

in a case of receiving third information from the second device including a third application identifier and a third operation command, determining whether or not to transfer the third information to the third device based on whether or not the third application identifier and the third operation command are included in the first information; and updating the first information by including therein a result of the determining.

B3. The method according to example B1, wherein the at least one operation command is selected by a user of the third device.

B4. A first device comprising:

generator circuitry configured and/or programmed to generate first information associating a first application identifier with at least one operation command which a second device is authorized to use to control a third device; and transmitter circuitry configured and/or programmed to, in a case of receiving from the second device, second information including a second application identifier and a second operation command which are included in the first information, transfer the second information to the third device.

B5. The first device according to example B4, wherein the generator circuitry is configured and/or programmed to, in a case of receiving third information from the second device including a third application identifier and a third operation command, determine whether or not to transfer the third information to the third device based on whether or not the third application identifier and the third operation command are included in the first information; and update the first information by including therein a result of the determining.

B6. The first device according to example B4, wherein the at least one operation command is selected by a user of the third device.

B7. A system comprising:

a first device;

a second device; and a third device to be controlled by the second device, wherein the first device comprises:

generator circuitry configured and/or programmed to generate first information associating a first application identifier with at least one operation command which the second device is authorized to use to control the third device; and transmitter circuitry configured and/or programmed to, in a case of receiving from the second device, second information including a second application identifier and a second operation command which are included in the first information, transfer the second information to the third device.

B8. The system according to example B7, wherein the generator circuitry is configured and/or programmed to, in a case of receiving third information from the second device including a third application identifier and a third operation command, determine whether or not to transfer the third information to the third device based on whether or not the third application identifier and the third operation command are included in the first information; and update the first information by including therein a result of the determining.

B9. The system according to example B7, wherein the at least one operation command is selected by a user of the third device.

Example C

C1. A method for a first device, the method comprising:

receiving from a second device, first information including a first application identifier and a first operation command, the first application identifier identifying a first application installed in the second device, and the first operation command being used by the first application to control a third device; and transferring the first information to the third device in a case that the first application identifier and the first operation command are authorized for the second device to control the third device.

C2. The method according to example C1, further comprising:

determining whether or not the first application identifier and the first operation command are authorized for the second device to control the third device, based on whether or not the first application identifier and the first operation command are included in second information stored in the first device, the second information associating an application identifier with at least one operation command which the second device is authorized to use to control the third device; and updating the second information by including therein a result of the determining.

C3. The method according to example C2, wherein the at least one operation command is selected by a user of the third device.

C4. A first device comprising:

receiver circuitry configured and/or programmed to receive from a second device, first information including a first application identifier and a first operation command, the first application identifier identifying a first application installed in the second device, and the first operation command being used by the first application to control a third device; and transmitter circuitry configured and/or programmed to transfer the first information to the third device in a case that the first application identifier and the first operation command are authorized for the second device to control the third device.

C5. The first device according to example C4, further comprising:

determinator circuitry configured and/or programmed to determine whether or not the first application identifier and the first operation command are authorized for the second device to control the third device, based on whether or not the first application identifier and the first operation command are included in second information stored in the first device, the second information associating an application identifier with at least one operation command which the second device is authorized to use to control the third device; and generator circuitry configured and/or programmed to generate the second information, and update the second information by including therein a result of the determining.

C6. The first device according to example C5, wherein the at least one operation command is selected by a user of the third device.

C7. A system comprising:

a first device;

a second device; and a third device to be controlled by the second device, wherein the first device comprises:

receiver circuitry configured and/or programmed to receive from a second device, first information including a first application identifier and a first operation command, the first application identifier identifying a first application installed in the second device, and the first operation command being used by the first application to control a third device; and transmitter circuitry configured and/or programmed to transfer the first information to the third device in a case that the first application identifier and the first operation command are authorized for the second device to control the third device.

C8. The system according to example C7, wherein the first device further comprises:

determinator circuitry configured and/or programmed to determine whether or not the first application identifier and the first operation command are authorized for the second device to control the third device, based on whether or not the first application identifier and the first operation command are included in second information stored in the first device, the second information associating an application identifier with at least one operation command which the second device is authorized to use to control the third device; and generator circuitry configured and/or programmed to generate the second information, and update the second information by including therein a result of the determining.

C9. The system according to example C8, wherein the at least one operation command is selected by a user of the third device.

Example D

D1. A method for a first device, the method comprising:

receiving from a second device, first information including a first application identifier and a first operation command, the first application identifier identifying a first application installed in the second device, and the first operation command being used by the first application to control a third device;

determining whether or not the first application identifier and the first operation command are authorized for the second device to control the third device; and transferring the first information to the third device in a case that the first application identifier and the first operation command are determined to be authorized.

D2. The method according to example D1, wherein determining whether or not the first application identifier and the first operation command are authorized comprises determining whether or not the first application identifier and the first operation command are included in second information stored in the first device, the second information associating an application identifier with at least one operation command which the second device is authorized to use to control the third device;

in a case that the first application identifier and the first operation command are included in the second information, determining that the first application identifier and the first operation command are authorized;

in a case that the first application identifier and the first operation command are not included in the second information, determining that the first application identifier and the first operation command are not authorized; and updating the second information by including therein a result of the determining.

D3. The method according to example D2, wherein the at least one operation command is selected by a user of the third device.

D4. A first device comprising:

receiver circuitry configured and/or programmed to receive from a second device, first information including a first application identifier and a first operation command, the first application identifier identifying a first application installed in the second device, and the first operation command being used by the first application to control a third device;

determinator circuitry configured and/or programmed to determine whether or not the first application identifier and the first operation command are authorized for the second device to control the third device; and transmitter circuitry configured and/or programmed to transfer the first information to the third device in a case that the first application identifier and the first operation command are determined to be authorized.

D5. The first device according to example D4, wherein the determinator circuitry is configured and/or programmed to determine whether or not the first application identifier and the first operation command are included in second information stored in the first device, the second information associating an application identifier with at least one operation command which the second device is authorized to use to control the third device, in a case that the first application identifier and the first operation command are included in the second information, determine that the first application identifier and the first operation command are authorized, and in a case that the first application identifier and the first operation command are not included in the second information, determine that the first application identifier and the first operation command are not authorized.

D6. The first device according to example D5, further comprising:

generator circuitry configured and/or programmed to generate the second information, and update the second information by including therein a result of the determining.

D7. The first device according to example D5, wherein the at least one operation command is selected by a user of the third device.

D8. A system comprising:

a first device;

a second device; and a third device to be controlled by the second device, wherein the first device comprises:

receiver circuitry configured and/or programmed to receive from a second device, first information including a first application identifier and a first operation command, the first application identifier identifying a first application installed in the second device, and the first operation command being used by first application to control a third device;

determinator circuitry configured and/or programmed to determine whether or not the first application identifier and the first operation command are authorized for the second device to control the third device; and transmitter circuitry configured and/or programmed to transfer the first information to the third device in a case that the first application identifier and the first operation command are determined to be authorized.

D9. The system according to example D8, wherein the determinator circuitry is configured and/or programmed to determine whether or not the first application identifier and the first operation command are included in second information stored in the first device, the second information associating an application identifier with at least one operation command which the second device is authorized to use to control the third device, in a case that the first application identifier and the first operation command are included in the second information, determine that the first application identifier and the first operation command are authorized, and in a case that the first application identifier and the first operation command are not included in the second information, determine that the first application identifier and the first operation command are not authorized.

D10. The system according to example D9, wherein the first device further comprises:

generator circuitry configured and/or programmed to generate the second information, and update the second information by including therein a result of the determining.

D11. The system according to example D9, wherein the at least one operation command is selected by a user of the third device.

What is claimed is:

1. A first device comprising:

receiver circuitry configured and/or programmed to receive from a second device via a first network, first information for controlling a third device, the first to the third devices being separated from one another;

determinator circuitry configured and/or programmed to determine whether or not the first information is to be transmitted to the third device, based on whether or not the first information is associated with second information stored in the first device, the second information including at least a first operation command for controlling a first operation of the third device; and transmitter circuitry configured and/or programmed to, in a case that the first information is determined to be transmitted to the third device, transmit the first information to the third device via a second network.

2. The first device according to claim 1, wherein the determinator circuitry is configured and/or programmed to determine whether or not the first information is to be transmitted to the third device, based on the second information and third information, the third information indicating at least one result of previous determination by the determinator circuitry.

3. The first device according to claim 1, wherein the first information is transmitted by an application installed in the second device, and the determinator circuitry is configured and/or programmed to determine to transmit the first information to the third device, in a case that the control information is associated with the second information by an authenticator who authenticates the application.

4. The first device according to claim 3, wherein the second information includes a plurality of operation commands provided by a provider of the application, and the determinator circuitry is configured and/or programmed to determine to transmit the first information to the third device, in a case that the control information is associated with at least one of the plurality of operation commands by the authenticator.

5. The first device according to claim 4, wherein the second information includes a second operation command selected by a user of the third device from the plurality of operation commands, and the determinator circuitry is configured and/or programmed to determine to transmit the first information to the third device, in a case that the control information is associated with the second operation command.

6. A method for a first device, the method comprising:

receiving from a second device via a first network, first information for controlling a third device, the first to the third devices being separated from one another;

determining whether or not the first information is to be transmitted to the third device, based on whether or not the first information is associated with second information stored in the first device, the second information including at least a first operation command for controlling a first operation of the third device; and in a case that the first information is determined to be transmitted to the third device, transmitting the first information to the third device via a second network.

7. The method according to claim 6, wherein determining whether or not the first information is to be transmitted to the third device is performed based on the second information and third information, the third information indicating at least one result of previous determination.

8. The method according to claim 6, wherein the first information is transmitted by an application installed in the second device, and the method further comprises determining to transmit the first information to the third device, in a case that the control information is associated with the second information by an authenticator who authenticates the application.

9. The method according to claim 8, wherein the second information includes a plurality of operation commands provided by a provider of the application, and the method further comprises determining to transmit the first information to the third device, in a case that the control information is associated with at least one of the plurality of operation commands by the authenticator.

10. The method according to claim 9, wherein the second information includes a second operation command selected by a user of the third device from the plurality of operation commands, and the method further comprises determining to transmit the first information to the third device, in a case that the control information is associated with the second operation command.

11. A system comprising:

a first device;

a second device to be controlled by the first device; and a third device configured to communicate with the first device via a first network and to communicate with the second device via a second network, wherein the first to the third devices are separated from one another, the third device includes:

receiver circuitry configured and/or programmed to receive from the first device via the first network, first information for controlling the second device;

determinator circuitry configured and/or programmed to determine whether or not the first information is to be transmitted to the second device, based on whether or not the first information is associated with second information stored in the third device, the second information including at least a first operation command for controlling a first operation of the second device; and transmitter circuitry configured and/or programmed to, in a case that the first information is determined to be transmitted to the second device, transmit the first information to the second device via the second network.

12. The system according to claim 11, wherein the determinator circuitry is configured and/or programmed to determine whether or not the first information is to be transmitted to the second device, based on the second information and third information, the third information indicating at least one result of previous determination by the determinator circuitry.

13. The system according to claim 11, wherein the first information is transmitted by an application installed in the first device, and the determinator circuitry is configured and/or programmed to determine to transmit the first information to the second device, in a case that the control information is associated with the second information by an authenticator who authenticates the application.

14. The system according to claim 13, wherein the second information includes a plurality of operation commands provided by a provider of the application, and the determinator circuitry is configured and/or programmed to determine to transmit the first information to the second device, in a case that the control information is associated with at least one of the plurality of operation commands by the authenticator.

15. The system according to claim 14, wherein the second information includes a second operation command selected by a user of the second device from the plurality of operation commands, and the determinator circuitry is configured and/or programmed to determine to transmit the first information to the second device, in a case that the control information is associated with the second operation command.

* * * * *